United States Patent [19]
Jeung

[11] Patent Number: 5,636,804
[45] Date of Patent: Jun. 10, 1997

[54] DOUBLE-BEARING FISHING REEL

[75] Inventor: Jong-O Jeung, Inchon, Rep. of Korea

[73] Assignee: Bando Leports, Ltd., Inchon, Rep. of Korea

[21] Appl. No.: 619,080

[22] Filed: Mar. 21, 1996

Related U.S. Application Data

[63] Continuation-in-part of Ser. No. 507,062, Jul. 26, 1995, abandoned, which is a continuation of Ser. No. 292,716, Aug. 18, 1994, abandoned.

[30] Foreign Application Priority Data

| Oct. 5, 1993 | [KR] | Rep. of Korea | 20325/93 |
| Nov. 1, 1993 | [KR] | Rep. of Korea | 22699/93 |
| Mar. 11, 1994 | [KR] | Rep. of Korea | 4910 |

[51] Int. Cl.$^6$ ............................................. A01K 89/0155
[52] U.S. Cl. .......................... 242/288; 242/310; 242/321; 384/903
[58] Field of Search ................................ 242/288, 310, 242/313, 321; 384/903

[56] References Cited

U.S. PATENT DOCUMENTS

| 2,361,239 | 10/1944 | Ransom . | |
| 4,544,111 | 10/1985 | Nakajima | 242/288 |
| 4,750,684 | 6/1988 | Morimoto . | |
| 4,858,183 | 8/1989 | Puryear . | |
| 4,995,571 | 2/1991 | Kawai . | |
| 5,108,042 | 4/1992 | Puryear . | |
| 5,127,603 | 7/1992 | Morimoto | 242/310 |
| 5,160,099 | 11/1992 | Furomoto | 242/321 |
| 5,273,235 | 12/1993 | Sato . | |
| 5,292,087 | 3/1994 | Sato | 242/288 |

*Primary Examiner*—Katherine Matecki
*Attorney, Agent, or Firm*—Brumbaugh, Graves, Donohue & Raymond

[57] ABSTRACT

A structurally improved double-bearing fishing reel is disclosed. In the fishing reel, the magnet unit is mounted in opposition to and spaced apart from the conductive wheel of the spool and radially moves relative to the conductive wheel thus adjusting the gap between the magnet and the conductive wheel and preventing backlash of the reel. The above magnet unit reduces the axial size of the reel and achieves the recent trend of being a compact and light reel. As the magnet unit is placed in a conductive wheel receiving magnetic case, the magnetic line of force is prevented from leaking. The present invention also reduces the number of parts of a holding unit, that is used for holding both a handle shaft and a spool shaft bearing, thus reducing the cost of the reel.

3 Claims, 8 Drawing Sheets

5,636,804

DOUBLE-BEARING FISHING REEL

This application is a continuation-in-part of application Ser. No. 08/507,062, filed Jul. 26, 1995, and now abandoned, which is a continuation of application Ser. No. 08/292,716, filed Aug. 18, 1994, and now abandoned.

BACKGROUND OF THE INVENTION

1. Field of the Invention

The present invention relates in general to double-bearing fishing reels and, more particularly, to a structural improvement in such fishing reels for reducing the axial size of the reel and thereby achieving the recent trend of being a compact and light reel. The above structural improvement is achieved by allowing a magnet unit to radially move relative to a spool shaft, the magnet unit being mounted in opposition to and spaced apart from a conductive wheel of the spool and being adapted for generating the eddy current in the conductive wheel.

2. Description of the Prior Art

In a typical double-bearing fishing reel, a spool is driven by rotating a handle coupled to one side cover of the reel. A magnet unit is placed in opposition to and spaced apart from a conductive wheel, thus forming an anti-backlash unit. The conductive wheel is formed on one side of the spool. In the above double-bearing fishing reel, the nonmagnetic spool is rotated as the fish line is cast from the spool. The magnet unit in the above state moves in an axial direction of the spool to adjust the gap between the magnet unit and the conductive wheel. The magnet unit thus controls the eddy current generated in the conductive wheel and thereby adjusts the spool drag force of the reel.

U.S. Pat. Nos. 2,361,239 and 5,108,042 disclose double-bearing fishing reels with such an anti-backlash unit. The above U.S. fishing reels have an advantage in that they effectively generate spool drag force on a portion spaced apart from the center of the spool shaft. The magnet unit in the above U.S. fishing reels is directly fixed to a movable cam disc inside one side cover of the reel and selectively axially moves relative to a conductive wheel of the spool, thus generating spool drag force. However, the magnetic line of force of the above magnet unit leaks outside a support plate of the side cover, thereby causing iron powder to be magnetically attracted to the support plate. The iron powder attracted to the support plate may be inserted into the gap between the support plate and the fitting portion of the spool, thus preventing the smooth rotating motion of the spool and causing operational noise in the reel. The above magnet unit also enlarges the axial size of the reel and increases the weight of the reel.

FIG. 1 shows a structure for holding both a handle shaft and a spool shaft bearing in a typical double-bearing fishing reel. As shown in the drawing, the handle shaft 101 is rotatably mounted to one side cover 100 of the reel by inserting one end portion of the handle shaft 101, that has an annular groove, through a hole of a bracket plate 103 prior to engaging with a snap ring 105 inside the plate 103. The above bracket plate 103 is mounted to the side cover 100 by a plurality of screws 106, while the snap ring 105 is fitted over the annular groove of the shaft 101.

However, the above holding structure has a problem in that it requires a plurality of elements, such as the snap ring 105, screws 106 and retainers R for the spool shaft bearing, and thereby increases the cost of the reel. In addition, when the rotating force of the handle is not uniformly applied to all the screws 106 of the plate 103 but concentrically applied to a part of the screws 106, the rotating force may not only cause the screws 106 to be loosened and separated from the side cover 100, it also bends the bracket plate 103, thus reducing the operational reliability of the reel.

SUMMARY OF THE INVENTION

It is, therefore, an object of the present invention to provide a double-bearing fishing reel in which the above problems can be overcome and whose magnet unit that is mounted in opposition to and spaced apart from the conductive wheel of the spool radially moves relative to the spool shaft thus reducing the axial size of the reel and achieving the recent trend of being a compact and light reel.

It is another object of the present invention to provide a double-bearing fishing reel whose magnet unit is placed in a conductive wheel receiving magnetic case thus preventing the magnetic line of force from leaking.

It is a further object of the present invention to provide a double-beating fishing reel which reduces the number of parts of a holding unit, that is used for holding both a handle shaft and a spool shaft bearing, thus reducing the cost of the reel.

In order to accomplish the above objects, the present invention provides a double-bearing fishing reel including a spool rotatably mounted between a pair of side covers, a conductive wheel mounted to the spool and received in a magnetic case and having a thickened peripheral portion and depressed central portion, a magnet unit movably interposed between the conductive wheel and the magnetic case and coupled to a rotatable knob of one side cover to be radially movable relative to the conductive wheel by a rotating motion of the knob thus facing either the thickened peripheral or depressed central portion of the conductive wheel, a guide rod axially extending from the magnet unit and coupled to the knob after passing the magnetic case to cooperate with the rotating motion of the knob for radially moving the magnet unit relative to the conductive wheel, and a holding unit for holding both the handle shaft and a spool shaft bearing using one holding bracket.

The holding unit has a support plate having an eccentric flange, an inside boss for receiving the spool shaft bearing, a handle shaft receiving hole and a threaded hole. The double-armed holding bracket is screwed to the threaded hole inside the support plate. The holding bracket has two arms for holding the handle shaft and spool shaft bearing, respectively.

The rotating knob has an eccentric arcuate slot for movably receiving the guide rod of the magnet unit. The eccentric arcuate slot guides the guide rod to radially move the magnetic unit relative to the conductive wheel in accordance with the rotating motion of the knob.

The reel also includes a slot having a semicircular cross-section, and an openable cover. A resilient snap bolt is formed on the internal surface of the openable cover for snapping into the slot when closing the openable cover.

BRIEF DESCRIPTION OF DRAWINGS

The above and other objects, features and advantages of the present invention will be more clearly understood from the following detailed description taken in conjunction with the accompanying drawings, in which:

FIGS. 4A and 4B are sectional views showing the operation of the anti-backlash unit of FIG. 3, in which:

FIG. 4A shows the permanent magnets of a magnet unit in the state of facing the depressed center portion of a conductive wheel of the spool to be far away from the conductive wheel; and FIG. 4B shows the permanent magnets in the state of facing the thickened peripheral portion of the conductive wheel to be close to the conductive wheel;

DESCRIPTION OF THE PREFERRED EMBODIMENTS

Figure 1:
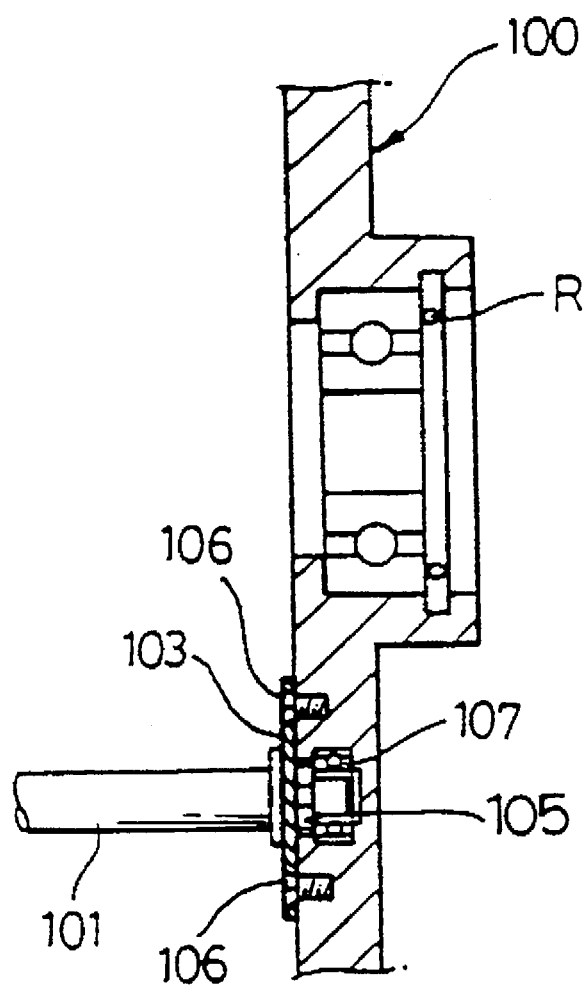
FIG. 1 is a sectional view showing the structure for holding both a handle shaft and a spool shaft bearing in a typical double-bearing fishing reel.
Figure 2:
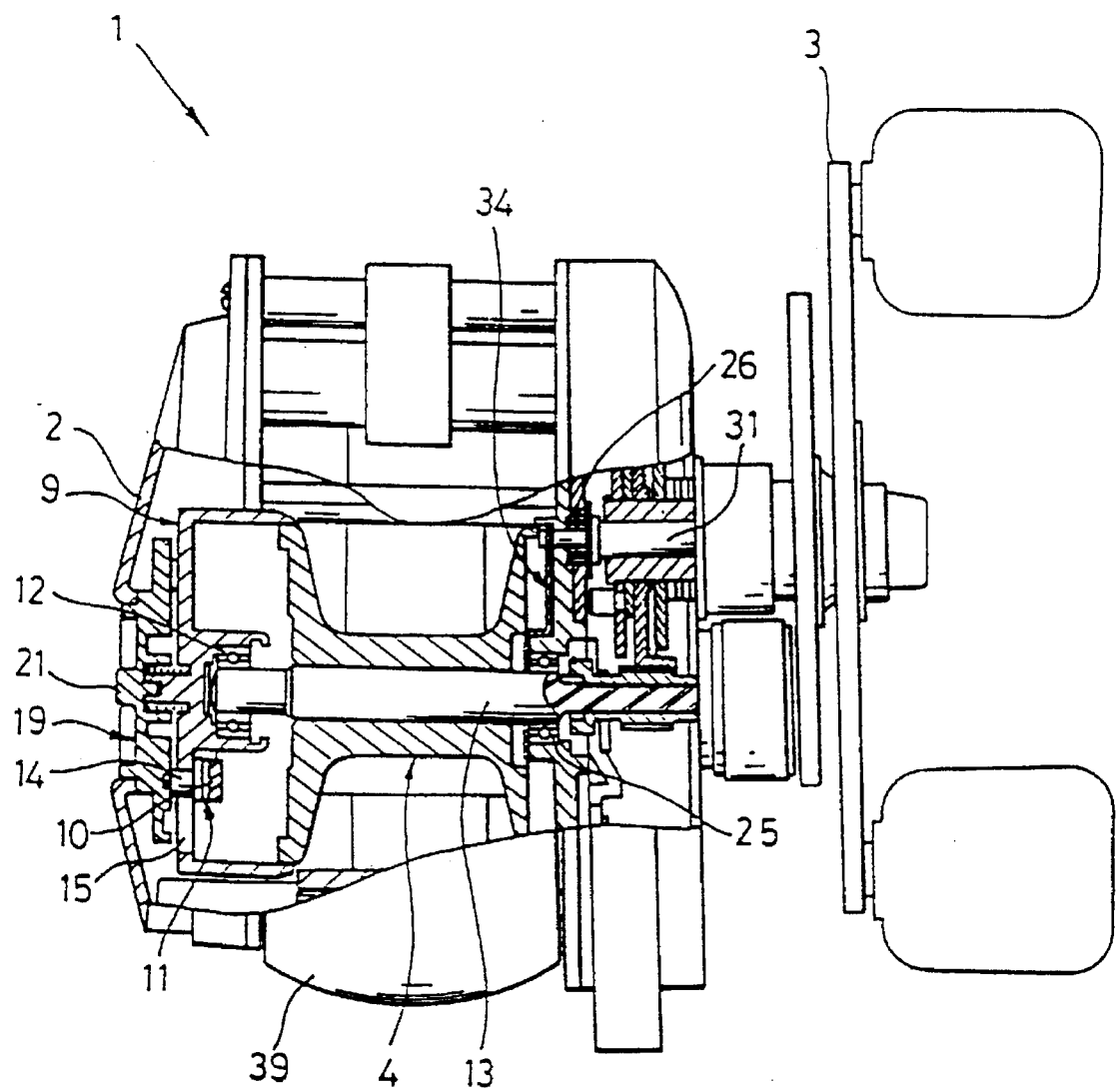
FIG. 2 is a partially sectioned front view showing the construction of a double-bearing fishing reel in accordance with a preferred embodiment of the present invention.
Figure 3:
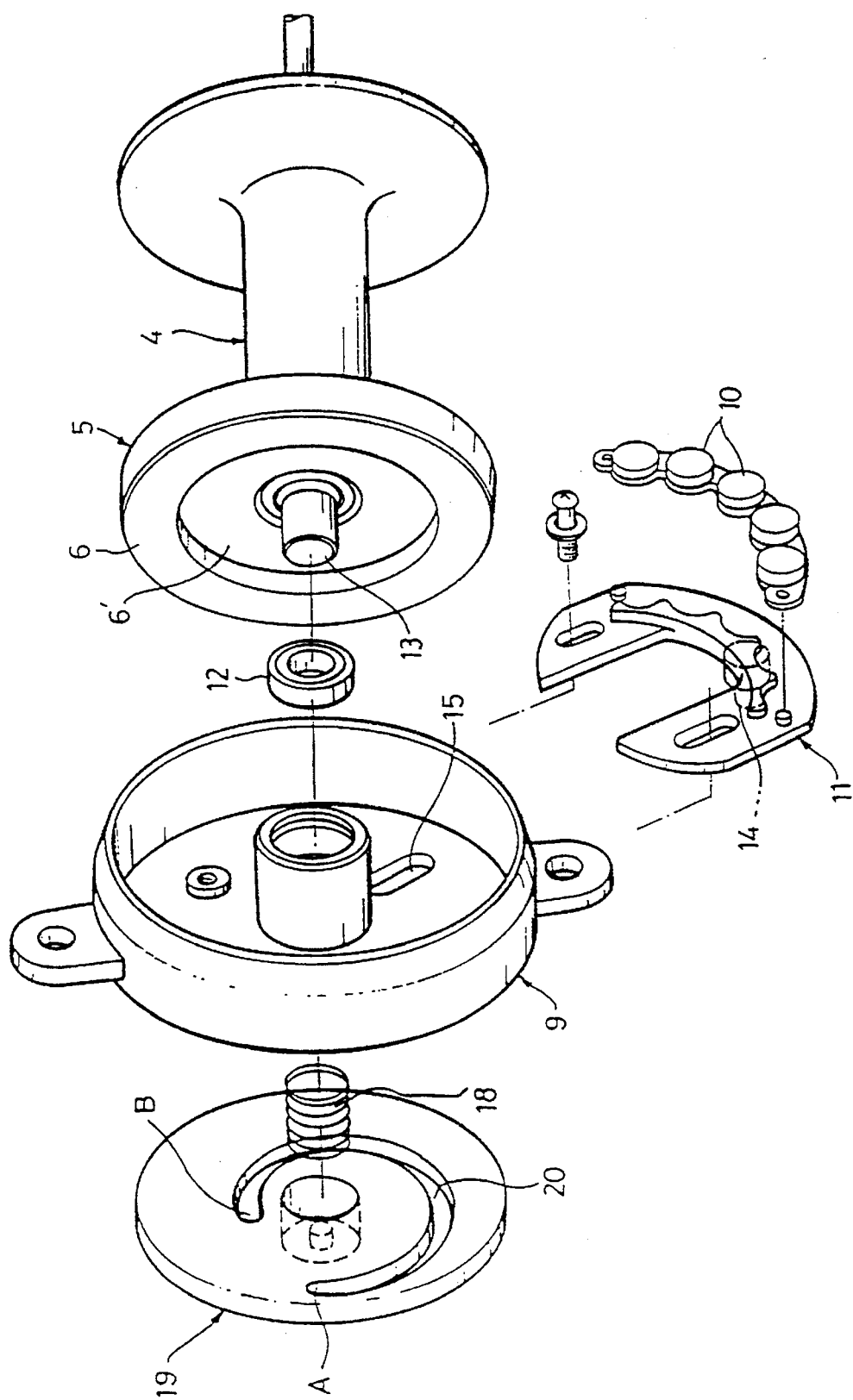
FIG. 3 is an exploded perspective view showing the construction of an anti-backlash unit in the fishing reel of this invention.
Figure 4:
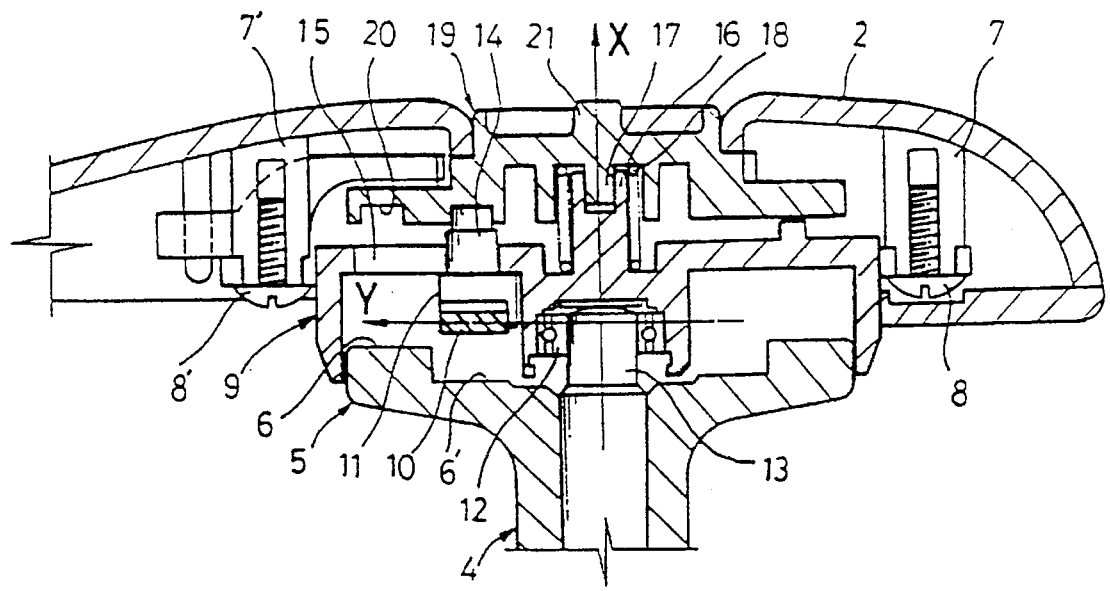
Figure 4:
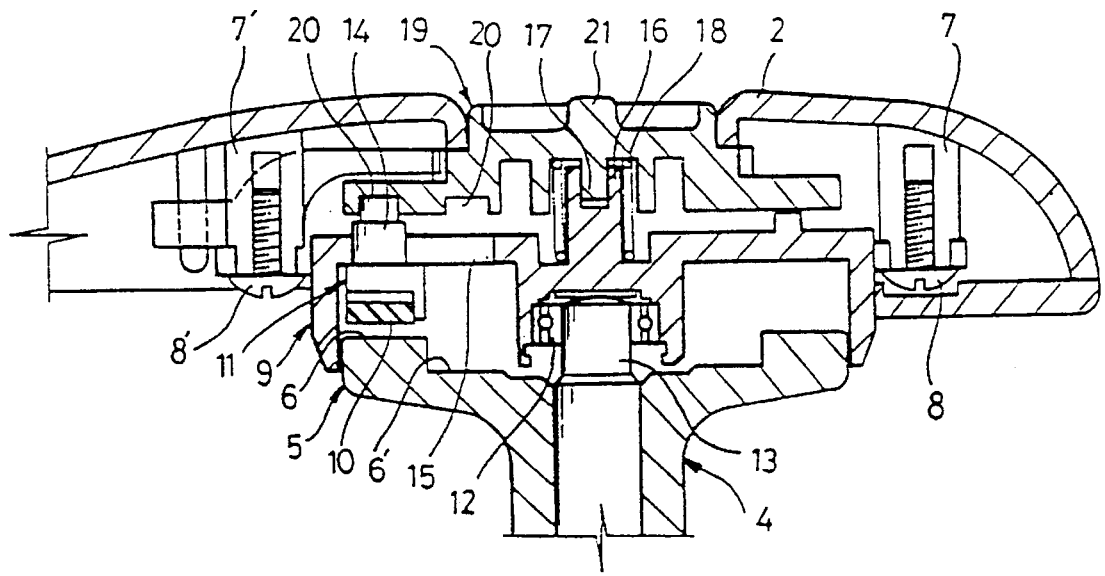
Figure 5:
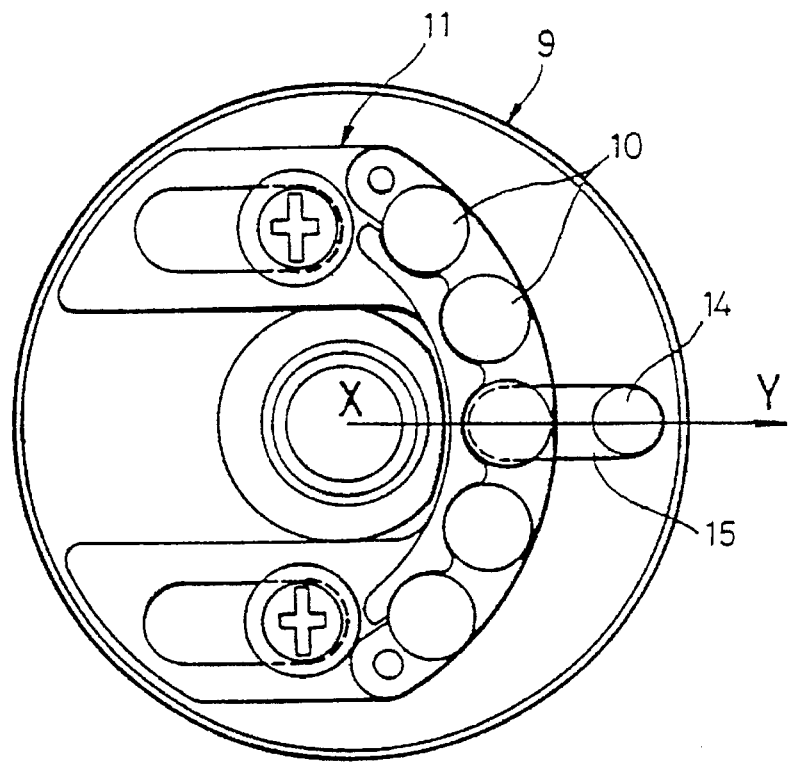
FIGS. 5A and 5B are views showing the positions of the magnet unit relative to the conductive wheel in the states of FIGS. 4A and 4B, respectively.
Figure 5:
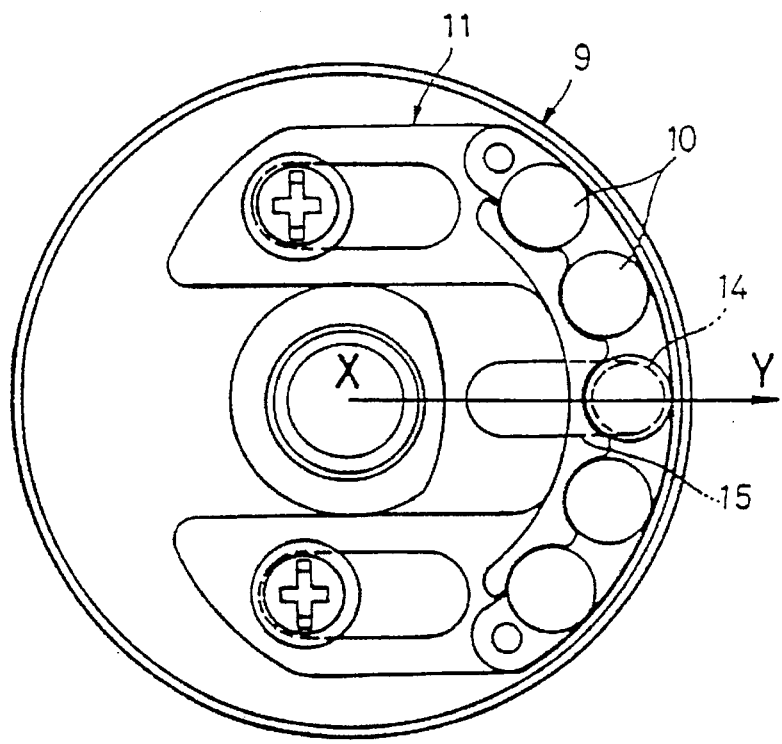
Figure 6:
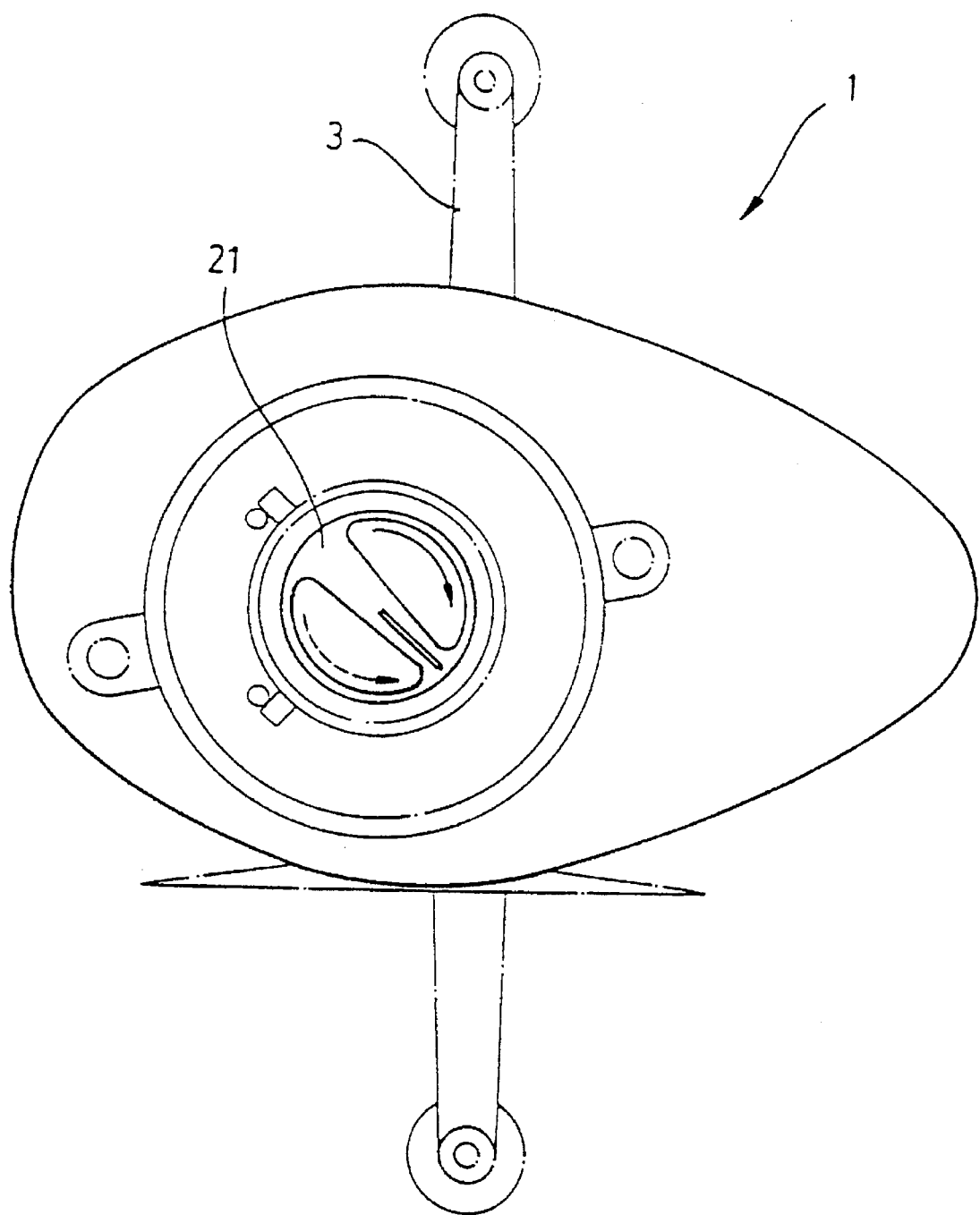
FIG. 6 is a schematic view showing the reel with a knob for adjusting the anti-backlash unit.
Figure 7:
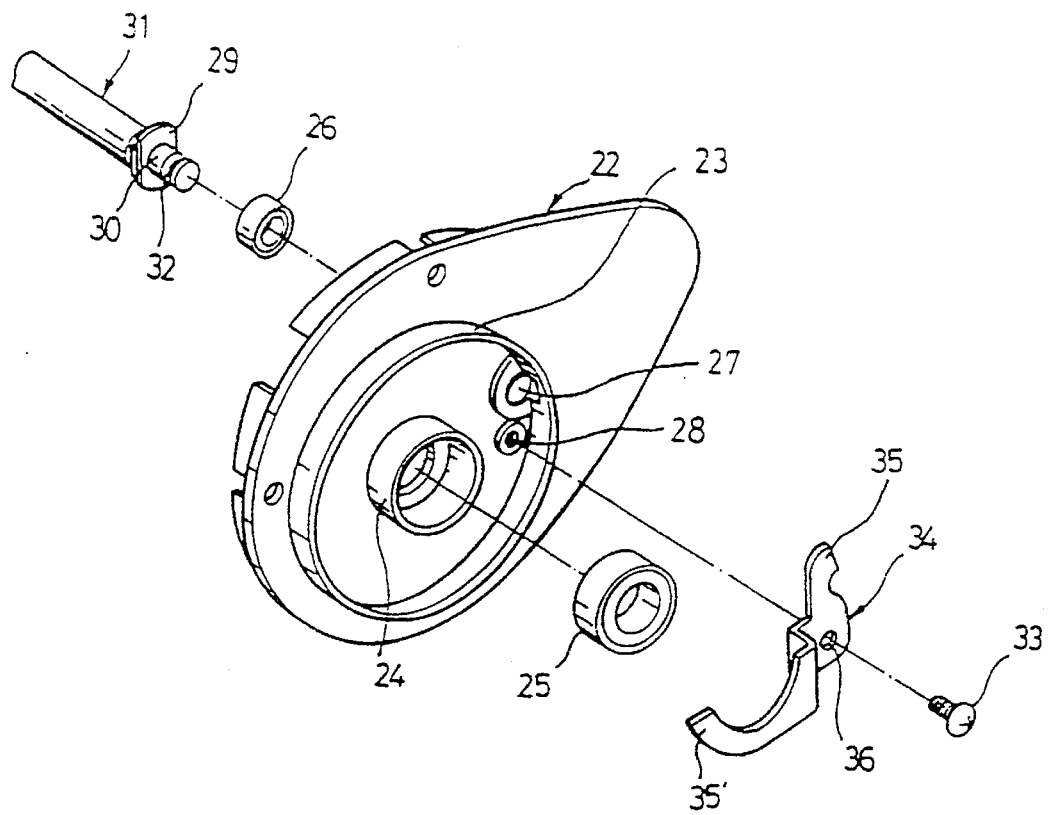
FIG. 7 is an exploded perspective view showing the construction of a holding unit used for holding both the handle shaft and the spool shaft bearing.
Figure 8:
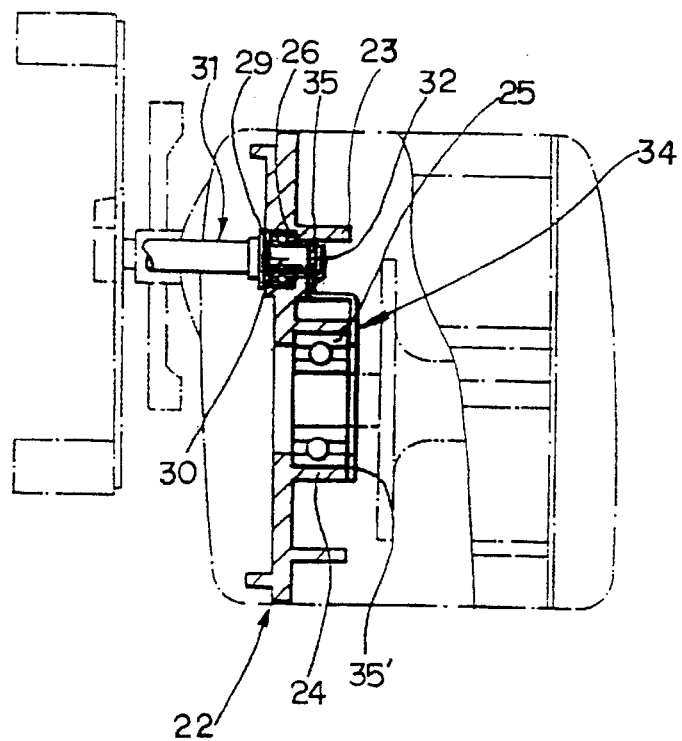
FIG. 8 is a partially sectioned view of the assembled holding unit with both the handle shaft and the spool shaft bearing held by the unit.
Figure 9:
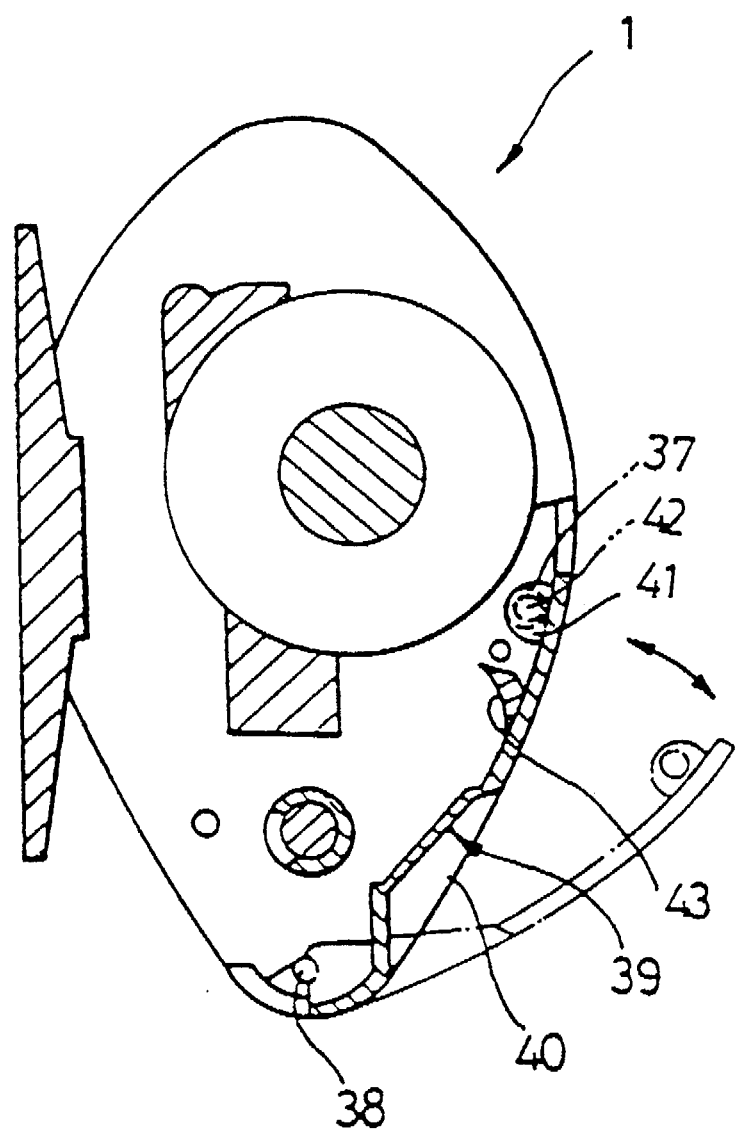
FIG. 9 is a view showing the operation of an openable cover unit of the above reel.

FIGS. 2 to 9 show a double-bearing fishing reel in accordance with a preferred embodiment of the present invention. As shown in the drawings, the fishing reel of this invention generally includes three units, that is, an anti-backlash unit, holding unit and openable cover unit. The anti-backlash unit, that is shown in FIGS. 3 to 5, adjusts the eddy current generated in a conductive wheel of a spool thereby adjusting the spool drag force in the reel. The holding unit, that is shown in FIGS. 7 and 8, holds both a handle shaft and a spool shaft bearing using one holding bracket. The openable cover unit, that is shown in FIG. 9, selectively opens a reel cover to expose a fish line guider of the reel.

In the above anti-backlash unit, the conductive wheel 5 is formed on one of the flanges of the spool 4. The spool 4 is formed of a nonmagnetic material such as aluminum and rotatably held by a pair of side covers 2. The conductive wheel 5 is depressed on its central portion, thus forming a depressed central portion 6' defined by a thickened peripheral portion 6. The above conductive wheel 5 is received in a magnetic case 9. The magnetic case 9 has an inside boss for holding the spool shaft 13. In order to rotatably hold the spool shaft 13 in the inside boss of the case 9, a bearing 12 is fitted over the shaft 13 inside the boss. A magnet unit 11 is movably mounted inside the case 9. The above unit 11 radially moves relative to the inside boss of the case 9. A plurality of permanent magnets 10 are arranged on one side of the unit 11 to form an arcuate magnet arrangement, while a two-stepped cylindrical guide rod 14 extends from the other side of the unit 11. The larger diameter portion of the above guide rod 14 is movably received in a longitudinal guide opening 15 of the magnetic case 9. The above opening 15 is radially formed on the case 9.

An outside boss extends from the outer center of the case 9 and rotatably holds an adjusting knob 19. The above knob 19 has an eccentric arcuate slot 20 for movably receiving the smaller diameter portion of the above guide rod 14.

The holding unit of the reel holds both the handle shaft and the spool shaft bearing using one holding bracket as described above. The above holding unit includes a holding plate 22 that is placed inside the reel 1. An annular flange 23 is formed on the inside surface of the plate 22. Concentrically formed on the plate 22 inside the annular flange 23 is an inside boss 24. The above boss 24 tightly receives the spool shaft bearing 25 therein. The above plate 22 also has a pair of holes, that is, a handle shaft receiving hole 27 and an internally-threaded hole 28. The above holes 27 and 28 are placed near and inside the flange 23. The handle shaft 31 is coupled to the hole 27. The above handle shaft 31 has a guard 29 for sectioning an insert portion 30 from the other portion of the shaft 31. The above insert portion 30 with an annular groove 32 is received in the hole 27. The handle shaft bearing 26 is fitted over the insert portion 30 inside the hole 27. The annular groove 32 of the insert portion 30 in the above state projects out of the hole 27. Screwed to the internally-threaded hole 28 by a set screw 33 is a double-armed holding bracket 34. The above holding bracket 34 has two arcuate holding arms 35 and 35' which are opposite to each other. As shown in FIG. 8, one arm 35 of the holding bracket 34 engages with the annular groove 32 of the handle shalt 31 to hold the shaft 31 inserted in the hole 27. The other arm 35' is brought into tight contact with the external surface of the spool shaft bearing 25 to hold the bearing 25 inside the boss 24 of the plate 22.

As shown in FIG. 9, the openable cover unit includes a pair of slots 37 having a semicircular cross-section. The above slots are formed on the reel 1. An openable cover 39 is pivoted to the lower portion of the reel 1 by a pin 38. An opening 40 is formed on the reel 1 to selectively expose the fish line guider of the reel 1 to the atmosphere when the cover 39 is opened. The above cover unit also includes a pair of bolt supports 41 having a semicircular cross-section. The above bolt supports 41 are formed on the upper portion of the cover's internal surface. A resilient snap bolt 42 extends from the outside surface of each bolt support 41 and snaps into an associate semicircular slot 37 of the reel 1 when the cover 39 is closed. A cover support 43 integrally formed on the reel 1. The above cover support 43 comes into contact with the internal surface of the cover 39 when the cover 39 is fully closed.

The operational effect of the above reel will be described hereinbelow.

The anti-backlash unit is operated as follows.

In order to reduce the gap between the magnet unit 11 and the conductive wheel 5, the handle 21 of the knob 19 is turned clockwise as shown in FIG. 6. When the knob's handle 21 is turned clockwise, the smaller diameter portion of the two-stepped cylindrical guide rod 14 extending from the magnet unit 11 reaches the portion "A" (see FIG. 3) of the eccentric arcuate slot 20 of the knob 19. Once the handle 21 in the above state is further turned slightly in the same direction, the larger diameter portion of the guide rod 14 moves outward under the guide of the longitudinal guide opening 15 of the magnetic case 9 as shown in FIG. 5B. That is, the permanent magnets 10 of the magnet unit 11 move radially outward relative to the spool shaft 13 to face the thickened peripheral portion 6 of the conductive wheel 5 as shown in FIG. 4B. The reel 1 in the above state thus achieves the minimum gap between the magnet unit 11 and the conductive wheel 5.

In order to enlarge the gap between the magnet unit 11 and the conductive wheel 5, the handle 21 of the knob 19 is turned counterclockwise as shown in FIG. 6. When the knob's handle 21 is turned counterclockwise, the smaller diameter portion of the two-stepped cylindrical guide rod 14 reaches the portion "B" (see FIG. 3) of the eccentric arcuate slot 20. Once the handle 21 in the above state is further turned slightly in the same direction, the larger diameter portion of the guide rod 14 moves inward under the guide of the guide opening 15 of the magnetic case 9 as shown in FIG. 5A. That is, the permanent magnets 10 of the magnet unit 11 move radially inward relative to the spool shaft 13 to face the depressed central portion 6' of the conductive wheel 5 as shown in FIG. 4A. The reel 1 in the above state thus achieves the maximum gap between the magnet unit 11 and the conductive wheel 5.

As described above, the magnet unit 11 radially moves inward or outward relative to the spool shaft 13. The permanent magnets 10 of the unit 11 thus face either the depressed central portion 6' or the thickened peripheral portion 6 of the conductive wheel 5, thereby adjusting the gap between the magnets 10 and the wheel 5. Therefore, the eddy current generated in the conductive wheel 5 by the magnetic line of force of the magnets 10 can be adjusted to control the spool drag force of the reel 1.

The holding unit holds both the handle shaft 31 and the spool shaft bearing 25 as follows.

The insert portion 30 of the handle shaft 31 with the handle shaft bearing 26 is fully inserted into the hole 27 of the holding plate 22 at the outside of the plate 22. The guard 29 of the handle shaft 31 in the above state comes into close contact with the bearing 26, while the distal end portion with the annular groove 32 projects out of the hole 27 at the inside of the plate 22. On the other hand, the spool shaft bearing 25 is fitted in the inside boss 24 of the plate 22. In addition, the double-armed holding bracket 34 is screwed to the internally-threaded hole 28 of the plate 22. In this case, the set screw 33 is threaded into the hole 28 after passing a threaded hole 36 of the bracket 34 thereby screwing the bracket 34 to the hole 28. One arm 35 of the holding bracket 34 engages with the annular groove 32' of the handle shaft 31 to hold the shaft 31, while the other arm 35' is brought into tight contact with the external surface of the spool shaft bearing 25 to hold the bearing 25 inside the boss 24 of the plate 22. The above holding unit thus holds both the handle shaft 31 and the spool shaft bearing 25 using one holding bracket 34.

The openable cover unit is operated as follows.

As shown in FIG. 9, the openable cover 39 is easily closed by turning the cover 39 counterclockwise prior to slightly pushing the cover 39 relative to the reel 1. The resilient snap bolts 42 of the cover 39 in the above state snap into the semicircular slots 37 of the reel 1 thus maintaining the closed position of the cover 39. In addition, the bolt supports 41 and internal surface of the cover 39 in the above state comes into close contact with the cover support 43 of the reel 1, so the cover 39 is neither suddenly opened nor moves in the opening 40 of the reel 1.

In order to open the cover 39, the cover 39 is turned clockwise with the upper portion of the cover 39 gripped by the user's fingers. The snap bolts 42 in the above state are elastically separated from the slots 37 to open the cover 39.

As described above, the present invention provides a structurally Improved double-bearing fishing reel. In the above fishing reel, the magnet unit, which controls the eddy current generated in the spool's conductive wheel and prevents backlash of the spool, is radially movable relative to the spool shaft thus reducing the axial size of the reel. The above fishing reel also includes a structurally improved openable cover unit suitable to prevent damage of the cover unit when the reel cover is opened or closed. The present invention also reduces the number of parts of a holding unit. The holding unit is used for holding both the handle shaft and the spool shaft bearing, so the invention reduces the cost of the reel. The above holding unit also prevents the handle shaft from axially moving when the handle shaft is rotated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A double-bearing fishing reel comprising a spool rotatably mounted between a pair of side covers, a handle shaft for generating rotational force, and transmission gears for transmitting said rotational force to the spool, the reel further comprising:

a conductive wheel mounted to one side of said spool and received in a magnetic case mounted on one of said side covers, said wheel having a thickened peripheral portion and depressed central portion;

a magnet unit movably interposed between said conductive wheel and said magnetic case, said magnet unit being coupled to a rotatable knob mounted to an outside surface of said one of said side covers to be radially movable relative to said conductive wheel by a rotating motion of said knob thus facing either the thickened peripheral or the depressed central portion of the conductive wheel and thereby adjusting the gap between a magnet of the magnet unit and the conductive wheel;

a guide rod axially extending from said magnet unit and passing through an opening in said magnetic case, said guide rod being coupled to said rotatable knob by cooperating means which cause said guide rod to move the magnet unit radially relative to the conductive wheel in accordance with the rotating motion of the knob; and a holding unit for holding both the handle shaft and a spool shaft bearing, said holding unit including:

a support plate mounted to the interior of the other side cover, said support plate having an annular flange, an inside boss for receiving said spool shaft bearing, a handle shaft receiving hole and a threaded hole; and a double-armed holding bracket mounted inside said support plate by a screw received in said threaded hole, said holding bracket having a first arm which holds the handle shaft and a second arm which holds the spool shaft bearing on the support plate.

2. The double-bearing fishing reel according to claim 1, wherein said cooperating means comprises an eccentric arcuate slot on said rotatable knob for movably receiving said guide rod of the magnet unit, said eccentric arcuate slot guiding said guide rod to radially move the magnet unit relative to said conductive wheel in accordance with the rotating motion of the knob.

3. The double-bearing fishing reel according to claim 1, further comprising:

a slot having a semicircular cross-section, said slot being formed on an exterior portion of said reel; and an openable cover pivoted to said reel, said openable cover having a resilient snap bolt on its internal surface, said snap bolt snapping into said slot when closing said openable cover.

* * * * *